Feb. 18, 1969 T. F. HANLON 3,428,743

ELECTROOPTIC CRYSTAL CONTROLLED VARIABLE COLOR MODULATOR

Filed Feb. 7, 1966

INVENTOR.
Thomas F. Hanlon

United States Patent Office 3,428,743
Patented Feb. 18, 1969

3,428,743

ELECTROOPTIC CRYSTAL CONTROLLED VARIABLE COLOR MODULATOR

Thomas F. Hanlon, 337 Tremont Ave., Fort Lee, N.J. 07024

Filed Feb. 7, 1966, Ser. No. 536,167
U.S. Cl. 178—5.4 2 Claims
Int. Cl. H04n *5/40, 5/48*

ABSTRACT OF THE DISCLOSURE

The electrooptic crystal controlled variable color modulator is a solid state device for producing additive color images in television reecivers, electrostatic copying machines and other photographic devices. It comprises a polarizer, a single electrooptic cell and a banded color filter with the primary colors, red, blue and green closely grouped in a repeated sequence with each color polarized at a different angle. Light entering the modulator is polarized in specific planes of transmission depending upon voltage potentials applied to the transparent electrodes of the modulator. Each color is selected by varying the voltage potential on the transparent electrodes of the modulator. Since each color is polarized at a different angle, light will pass through the selected color producing its color value and the unselected colors will be cross-polarized or darkend. Each color is selected in rapid sequence thus building an additive color image.

This invention relates to a color modulator and more particularly to an electrooptic crystal controlled variable color modulator for producing a color television image and for further producing a three color electrostatic image.

It is an object of the present invention to provide a device for producing a color television image by converting the standard NTSC color signal to a field sequential color signal, then applying the voltage from this signal to the kinescope of a conventional black and white receiver and to my electrooptic crystal controlled variable color modulator, which converts this voltage to field sequential color images, when my device is placed between the kinescope and the viewer. This device operates as follows; when a standard NTSC color signal is received in a conventional black and white television receiver, it contains the voltages of the simultaneous transmitted primary colors, this voltage is sent to an electronic field sequential converter. After conversion the voltage is applied to the kinescope where it controls the densities of the black and white image. This voltage is also applied to the electrodes of the two sheets of transparent electrical conducting glass of the electrooptic crystal controlled variable color modulator. This transparent assembly of electrooptic components is placed between the viewer and the kinescope of a black and white receiver. The light from the kinescope passes through a polarizer which polarizes the light in a single plane of transmission, it then passes through a sheet of electrical conducting glass, then through a sheet of a isomorphic electrooptic crystal, ammonium dihydrogen phosphate, then through another sheet of electrical conducting glass. When the field sequential voltage is applied to the electrodes of the two sheets of electrical conducting glass it sets up a stress in the isomorphic electrooptic crystal which has polar characteristics, this molecular stress changes the plane of polarization of the transmitted light from the kinescope.

This modulated light now passes through a three angle banded color filter, this filter has the three primary colors coated on it in a repeated sequence and each color band is placed at an angle 15 degrees out of phase with the other. Since the modulated light takes the plane of polarization corresponding to the field sequential color voltage applied, it will strike the banded color filter at the proper angle and pass through it producing a color of the proper sequence of the field sequential color signal. The signal light component passes through another polarizer to the viewer. A full color image will now be seen because the persistance of vision of the viewed couples the variation in density of the kinescopes black and white picture with the modulated color produced in the electrooptic crystal controlled variable color modulator, thus producing a field sequential color image.

Another object of the present invention is to provide a electrooptic crystal controlled variable color modulator that can be used for producing a three color electrostatic image in office copying machines and other photographic devices. This device operates as follows; the electrooptic crystal controlled variable color modulator is placed between the colored material to be reproduced and a selenium drum or zinc oxide paper. A light source is reflected off the colored material to be reproduced. This image passes through a polarizer which polarizes the light in a single plane of transmission, it then passes through a sheet of electrical conducting glass, then through an isomorphic electrooptic crystal sheet, ammonium dihydrogen phosphate, then through another sheet of electrical conducting glass. A voltage is applied to the electrodes of the two sheets of electrical conducting glass. This voltage sets up a stress in the isomorphic electrooptic crystal which has polar characteristics, this molecular stress changes the plane of polarization of the light reflected off the colored material to be reproduced. When this voltage is applied at three different potentials, the stress in the isomorphic electrooptic crystal will change the plane of polarization in three different angles 15 degrees different from the other. This light now passes through a three angle banded color filter. This filter has the three primary colors coated on it in a repeated sequence and each color band is placed at an angle 15 degrees out of phase with the other. Since the light takes the plane of polarization corresponding to one of three voltage potentials applied, it will strike the three angle banded color filter at the proper angle and pass through it producing one of the three primary colors from the material to be reproduced. This read-out of a primary color of the material being reproduced passes through another polarizer then strikes a positively charged electrostatic surface where it is electrostatically impressed upon a selenium drum or zinc oxide coated paper. This electrostatic image represents one of the three primary colors of the material being reproduced. Powdered color toners negatively charged of the three primary colors are electrically discharged to the electrostatic surface in sequence, as each color is read-out. Each toner of one of the three primary colors is discharged separately by electrical synchronization to the electrooptic crystal controlled variable color modulator. Between each sequence the toner of each color is heated and fixed and the positive charge removed from the electrostatic surface. When the three toners have been applied corresponding to the color densities scanned by the electrooptic crystal controlled variable color modulator, a full color electrostatic image will be produced. The color image is built up in three scanning sequences by the additive color method.

Still additional objects, benefits, and advantages of this invention will become evident from a study of the following detailed description taken in conjunction with the accompanying drawings, in which.

Figures 1, 2, 3, 4:
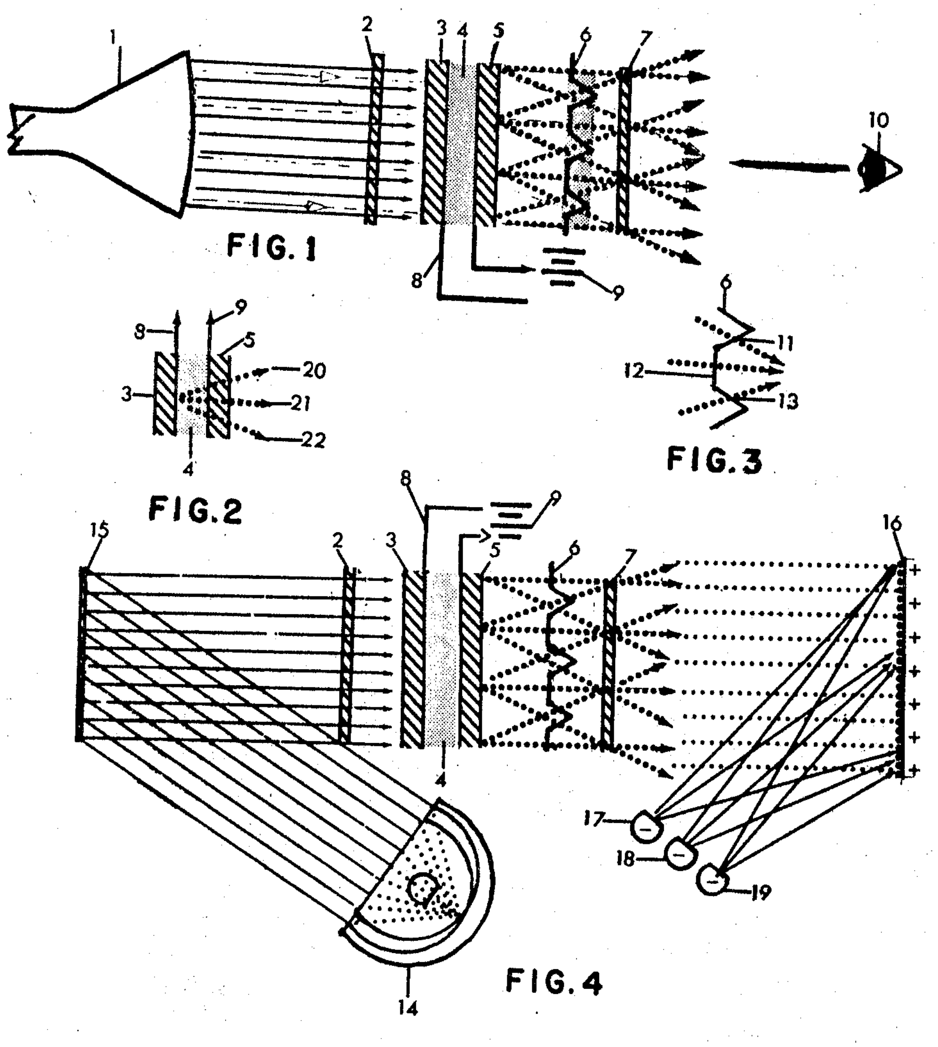
FIGURE 1 is a side elevation view of the complete electrooptic crystal controlled variable color modulator as it is used with a television kinescope.
FIGURE 2 is a side elevation view showing close detail of the electrooptic section.
FIGURE 3 is a side elevation view showing close detail of the three angle banded color filter.
FIGURE 4 is a side elevation view of the complete electrooptic crystal controlled variable color modulator as it is used for producing electrostatic color images.

Referring now specifically to the drawing, an electrooptic crystal controlled variable color modulator for producing a color television image FIGS. 1, 2, 3 made in accordance with the present invention, is shown to be a transparent assembly which can be made to any size and is placed between the kinescope 1, and the viewer 10, and is further shown to include a polarizer 2, a sheet of transparent electrical conducting glass 3, an isomorphic electrooptic transparent crystal sheet, ammonium dihydrogen phosphate or other crystals of the primary phosphate group 4, a sheet of transparent electrical conducting glass 5, a three angle banded color filter 6, of the three primary colors red 11, blue 12, green 13, a polarizer 7, voltage potential 8 and 9 connected to the electrodes of members 3 and 5.

Before detailing how the members of this device cooperate with each other, it is necessary to explain the nature of the parallel electrooptic effect produced in the device. First, consider the mechanics of light transmission through a transparent substance. Transparent media are composed of atoms or molecules carrying electric charges or dipoles. The refraction (or velocity) of light is then determined by the disposition and electro magnetic interaction of these particles with electric field component of the incident light wave. The application of an electric field of the transparent medium will produce displacement or deformation of the particles and thereby influence the refractive properties of the material. In the case of the electrooptic crystal, ammonium dihydrogen phosphate 4, a certain cut and alignment allows light to pass with equal velocities for all planes of polarization. However, the application of an electric field to the electrical conducting glass 3 and 5 reduces the phase velocity in the electrooptic crystal 4 in one specific plane of polarization, and increases it in a perpendicular plane of polarization, thus introducing a phase difference 20, 21, 22, in the electrooptic crystal 4. The parallel electrooptic effect may then be described as a linear change of the refractive indexes (or phase velocities) for a given applied electric field. This change is minimal but is satisfactory for a device based on phase shifts.

The members of the device cooperate as follows: Field sequential modulated light originating in the kinescope 1 is polarized into a single plane of transmission in polarizer 2, it then passes through a sheet of electrical conducting glass 3, then through an isomorphic electrooptic crystal sheet, ammonium dihydrogen phosphate 4, then through another sheet of electrical conducting glass 5, members 3 and 5 have a thin film of transparent electrical conducting metal deposited on the sides in contact with element 4. When a field sequential voltage 8 and 9 is applied to the electrodes of members 3 and 5 it sets up a stress in element 4, thus introducing a phase difference in one specific plane of polarization. The modulated light now passes through a three angle banded color filter 6, this filter has the three primary colors, red 11, blue 12, green 13, coated on it in a repeated sequence and each color band is placed at an angle 15 degrees out of phase with the other. Since the modulated light takes the plane of polarization 20, 21, 22, corresponding to the field sequential color voltage applied, it will strike the three angle banded color filter 6, at the proper angle and pass through it producing one of the primary colors, red 11, blue 12, green 13, in the proper sequence of the field sequential color signal. The image now passes through a polarizer 7 where the plane of polarization is reinforced and finally to the viewer 10 who will now see a full color image.

The operation of this device will now be readily understood. A color television image will be produced in the following manner: When a standard NTSC color signal is received in a conventional black and white television receiver it contains the voltages of the simultaneous transmitted primary colors, this voltage is sent to an electronic field sequential converter. This conversion process will be understood by electronic engineers. After conversion the voltage is applied to the kinescope 1, where it controls the densities of the field sequential black and white image. This voltage 8 and 9 is also applied to the electrodes of the two sheets of transparent electrical conducting glass 3 and 5, of the electrooptic crystal controlled variable color modulator 2, 3, 4, 5, 6, 7. This transparent assembly of electrooptic components is placed between the kinescope 1 of a black and white receiver and the viewer 10. The light from the kinescope 1 passes through a polarizer 2, which polarizes the light in a single plane of transmission. It then passes through a sheet of electrical conducting glass 3, then through a isomorphic electrooptic crystal sheet, ammonium dihydrogen phosphate 4, then through another sheet of electrical conducting glass 5. When the field sequential voltage 8 and 9 is applied to the electrodes of the two sheets of electrical conducting glass 3 and 5 which are in contact with element 4 it sets up a stress in the isomorphic electrooptic crystal sheet, ammonium dihydrogen phosphate 4, which has polar characteristics, this molecular stress changes the plane of polarization of the field sequential light transmitted from the kinescope 1. The modulated light now passes through a three angle banded color filter 6. This filter has the three primary colors, red 11, blue 12, green 13, coated on it in a repeated sequence and each color band is placed at an angle 15 degrees out of phase with the other. Since the field sequential modulated light takes the plane of polarization 20, 21, 22 corresponding to the field sequential color voltage applied to members 3 and 5, it will strike the three angle banded color filter 6, at the proper angle and pass through it producing one of the primary colors, red 11, blue 12, green 13, in the proper sequence of the field sequential color signal. The signal passes through another polarizer 7 where the plane of polarization is reinforced then to the viewer 10. A full color image will now be seen because the persistence of vision of the viewer 10 couples the variation in the density of the kinescopes 1 black and white field sequential picture with the modulated field sequential color produced in the electrooptic crystal controlled variable color modulator 2, 3, 4, 5, 6, 7, thus producing a combined synchronized field sequential color image.

Again referring specifically to the drawing, an electrooptic crystal controlled variable color modulator for producing a three color electrostatic image in office copying machines and other photographic devices FIGS. 4, 2, 3 made in accordance with the present invention is shown to include, a light source 14 which is reflected off the colored material to be reproduced 15. This image passes through a polarizer 2 which polarizes the light in a single plane of transmission, it then passes through a sheet of electrical conducting glass 3, and then through a isomorphic electrooptic crystal sheet, ammonium dihydrogen phosphate 4, then through another sheet of electrical conducting glass 5. A voltage potential 8 and 9 is applied to the electrodes of the two sheets of electrical conducting glass 3 and 5 which are in contact with element 4 which sets up a stress in the isomorphic electrooptic crystal sheet, ammonium dihydrogen phosphate 4 which has polar characteristics. This molecular stress changes the plane of polarization of the light 14, which is reflected off the colored material to be reproduced 15. When the voltage 8 and 9 is applied at three different potentials, the stress in the isomorphic electrooptic crystal sheet, ammonium dihydrogen phosphate 4 will change the plane of polarization 20, 21, 22, in three different angles 15 degrees out of phase from each other. This light now passes through a three angle banded color filter 6, this filter has the three primary colors, red 11, blue 12, green 13, coated on it in a repeated sequence and each color band is placed at an angle 15 degrees out of phase with the other. Since the light takes the plane of polarization corresponding to one of three voltage potentials applied thru 8 and 9, it will strike the three angle banded color filter 6 at the proper angle and pass through it producing one of the three primary colors, red 11, blue 12, green 13, from the material to be reproduced 15. This read-out of a primary color of the material being reproduced 15 passes through another polarizer 7 then strikes a positively changed electrostatic surface where it is electrostatically impressed upon a selenium drum or zinc oxide coated paper 16. This electrostatic image 16 represents the positive densities of one of the three primary colors of the material being reproduced 15. Powdered toners negatively charged of the three primary colors, red 17, blue 18, green 19, are electrically discharged to the electrostatic surface 16 in sequence, as each color is read-out from the material being reproduced 15. Each toner of one of three primary colors is discharged separately by electrical synchronization with the voltage potential 8 and 9 coupled to the electrodes of members 3 and 5 of the electrooptic crystal controlled variable color modulator, 2, 3, 4, 5, 6, 7. Between each sequence each of the colored toners, red 17, blue 18, green 19, are heated and fixed separately and the positive charge removed from the electrostatic surface 16. When the three toners, red 17, blue 18, green 19, have been applied corresponding to the color densities scanned by the electrooptic crystal controlled variable color modulator 2, 3, 4, 5, 6, 7, a full color image will be produced at 16.

The operation of this device will now be readily understood. A three color electrostatic image will be produced by use of the electrooptic crystal controlled variable color modulator 2, 3, 4, 5, 6, 7, and electrostatic toners of the three primary colors, red 17, blue 18, green 19, in the following manner: When a light source 14 is reflected off the colored material to be reproduced 15, this image will pass through a polarizer 2 which will polarize the light in a single plane of transmission, it will then pass through a sheet of electrical conducting glass 3, then through a isomorphic electrooptic crystal sheet, ammonium dihydrogen phosphate 4, then through another sheet of electrical conducting glass 5. A voltage 8 and 9 is applied to the electrodes of the two sheets of electrical conducting glass 3 and 5 which are in contact with element 4 and which sets up a stress in the isomorphic electrooptic crystal sheet, ammonium dihydrogen phosphate 4 which has polar characteristics, this molecular stress changes the plane of polarization of the light 14 reflected off the colored material to be reproduced 15. When the voltage 8 and 9 is applied at three different potentials, the stress in the isomorphic electrooptic crystal sheet, ammonium dihydrogen phosphate 4 will change the plane of polarization 20, 21, 22, in three different angles 15 degrees out of phase from the other. This light now passes through a three angle banded color filter 6, this filter has the three primary colors, red 11, blue 12, green 13, coated on it in a repeated sequence and each color band is placed at an angle 15 degrees out of phase with the other. Since the light takes the plane of polarization corresponding to one of the three voltage potentials applied through 8 and 9, it will strike the three angle banded color filter 6 at the proper angle and pass through it producing one of the three primary colors, red 11, blue 12, green 13, from the material to be reproduced 15. This read-out of a primary color of the material being reproduced 15 passes through another polarizer 7 where the plane of polarization is reinforced, then it strikes a positively charged electrostatic surface where it is electrostatically impressed upon a selenium drum or zinc oxide coated paper 16. This electrostatic image 16 represents a positive electrostatic density of one of the three primary colors of the material being reproduced 15. Powdered toners negatively charged of the three primary colors, red 17, blue 18, green 19, are electrically discharged to the electrostatic surface 16 in sequence, as each color is read-out from the material being reproduced 15. Each toner of one of the primary colors is discharged separately by electrical synchronization with the voltage potential 8 and 9 coupled to the electrodes of members 3 and 5 of the electrooptic crystal controlled variable color modulator, 2, 3, 4, 5, 6, 7. Between each sequence each of the colored toners, red 17, blue 18, green 19, are heated and fixed separately and the positive charge removed from the electrostatic surface 16. When the three colored toners 17, 18, 19, have been applied correspondingly to the color densities scanned by the electrooptic crystal controlled variable color modulator 2, 3, 4, 5, 6, 7, a full color image of the colored material 15 will be reproduced at 16. The color image is built up in three scanning sequences by the additive color method.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

1. A single electrooptic crystal controlled variable color modulator for producing an additive color television image comprising, in combination, a first polarizer which passes light in a single plane of transmission, a sheet of transparent isomorphic electrooptic crystal, two sheets of electrical conducting glass whose transparent electrodes are in contact with both sides of said crystal, a three angle banded color filter of the three primary colors red, blue and green, a second polarizer which polarizes each color at a different angle, conductors connected to apply voltage potentials to said electrodes and set up a molecular change of polarization in said crystal in one of three angles and pass modulated light originating in a kinescope successively through said first polarizer, said glass plates and said crystal therebetween, said filter and said second polarizer thereby producing each of the three primary colors in sequence and darkening the two unselected colors by cross-polarization depending on variations in voltage potentials applied to said electrodes and thus producing a field sequential additive color television image.

2. A single electrooptic crystal controlled variable color modulator for producing an additive three color electrostatic image, comprising a combination of elements including a light source, colored material to be reproduced, a first polarizer which passes light in a single plane of transmission, a sheet of transparent isomorphic electrooptic crystal, two sheets of electrical conducting glass whose transparent electrodes are in contact with said crystal, a three angle banded color filter of the three primary colors, red, blue and green and a second polarizer which polarizes each color at a different angle, an electrostatic surface positively charged, three toners each of a primary color and negatively charged, said elements being positioned so that said material to be reproduced is lighted and focused onto said electrooptic crystal controlled variable color modulator where it passes through the first polarizer and is polarized into a single plane of transmission and passes through said electrooptic crystal where the polarized plane of light is changed in its polarized angle depending upon the voltage potential applied to said electrodes, after which it passes through said filter which has the three primary colors coated on it in close sequence and then passes through said second polarizer which polarizes each color at a different angle so that plane polarized light that originates from said material assumes a polarized plane of transmission according to voltage potentials applied to said electrodes and passes through a single polarized color of said filter while simultaneously the other two unselected colors being at different angles are cross-polarized and darkened and the black and white density produced, whence the single primary color of said material is impressed upon an electrostatic surface positively charged and simultaneously in synchronization with the consequent color read-out a negatively charged color toner corresponding to said color read out being discharged to the positively charged electrostatic surface where it forms an electrostatic colored image of a single selected primary color and said image is heated and fixed and the positive charge removed and each of said three primary colors are read out in repeated sequence and brought to the electrostatic surface and the correct colored toner applied, heated and fixed, thus building up a three color electrostatic image by the additive color method.

References Cited

UNITED STATES PATENTS

| | | | |
|---|---|---|---|
| 2,277,013 | 3/1942 | Carlson | 178—6.6 |
| 2,493,200 | 1/1950 | Land | 178—5.4 XR |
| 2,638,416 | 5/1953 | Walkup et al. | 178—6.6 |
| 2,727,941 | 12/1955 | Fulmer | 178—5.4 |

ROBERT L. GRIFFIN, *Primary Examiner.*

R. MURRAY, *Assistant Examiner.*

U.S. Cl. X.R.

346—74